(12) United States Patent
Chernyak et al.

(10) Patent No.: US 7,347,097 B2
(45) Date of Patent: Mar. 25, 2008

(54) SERVO COMPENSATING ACCELEROMETER

(75) Inventors: Mykola G. Chernyak, Kiev (UA); Gennadiy A. Skrypkovskyy, Kiev (UA)

(73) Assignee: Innalabs Technologies, Inc., Dulles, VA (US)

( * ) Notice: Subject to any disclaimer, the term of this patent is extended or adjusted under 35 U.S.C. 154(b) by 0 days.

(21) Appl. No.: 11/470,206

(22) Filed: Sep. 5, 2006

(65) Prior Publication Data

US 2007/0204693 A1 Sep. 6, 2007

Related U.S. Application Data

(60) Provisional application No. 60/777,563, filed on Mar. 1, 2006.

(51) Int. Cl.
*G01P 15/00* (2006.01)
*G01P 15/08* (2006.01)
(52) U.S. Cl. .................... 73/514.17; 73/514.31
(58) Field of Classification Search ............ 73/514.17, 73/514.18, 514.23, 514.31, 514.39
See application file for complete search history.

(56) References Cited

U.S. PATENT DOCUMENTS

| | | | |
|---|---|---|---|
| 3,513,711 A | | 5/1970 | Rogall |
| 4,320,669 A | * | 3/1982 | Grohe .................... 74/5.37 |
| 4,357,837 A | * | 11/1982 | Beardmore .................. 74/5 F |
| 4,397,185 A | * | 8/1983 | Craig et al. ............ 73/504.11 |
| 4,498,342 A | | 2/1985 | Aske |
| 4,771,792 A | * | 9/1988 | Seale .................... 600/587 |
| 6,073,490 A | | 6/2000 | Konovalov |

FOREIGN PATENT DOCUMENTS

EP 0323709 A2 7/1989

OTHER PUBLICATIONS

Search Report in EP 07250845, issued on May 31, 2007.

* cited by examiner

*Primary Examiner*—Helen Kwok
(74) *Attorney, Agent, or Firm*—Bardmesser Law Group

(57) ABSTRACT

A servo compensating accelerometer includes a top housing half and a bottom housing half rigidly connected together, and each having coaxial threaded openings. A sensing element is positioned between the top and bottom halves and affixed to the bottom half. Top and bottom magnetic systems, each of which has a magnetic conductor, a permanent magnet and a field concentrator, the magnetic systems being mounted within the respective top and bottom halves of the housing using the threaded openings. A momentum sensor includes the top and bottom magnetic systems, and also includes two movable coils mounted on a plate and positioned within the magnetic systems. A differential angle sensor includes toroidal excitation coils located on the permanent magnets, the magnetic systems and the coils of the momentum sensor. Zero bias of the accelerometer's angular displacement sensor is tuned by adjusting the position of the magnetic systems by moving them in the threaded openings. Stop screws can be used to fix position of the magnetic systems relative to the top and bottom halves of the housing. Two perpendicular mounting surfaces are located on the bottom half of the housing. An electrical circuit that includes a preamplifier, a demodulator, a correcting element, a high frequency generator, an amplifier, the excitation coils and the movable coils, which collectively form a feedback circuit, and generate an output of the accelerometer using an inductor, a resistor, a capacitor and a filter. The sensing element, in one embodiment, can be metallic.

20 Claims, 11 Drawing Sheets

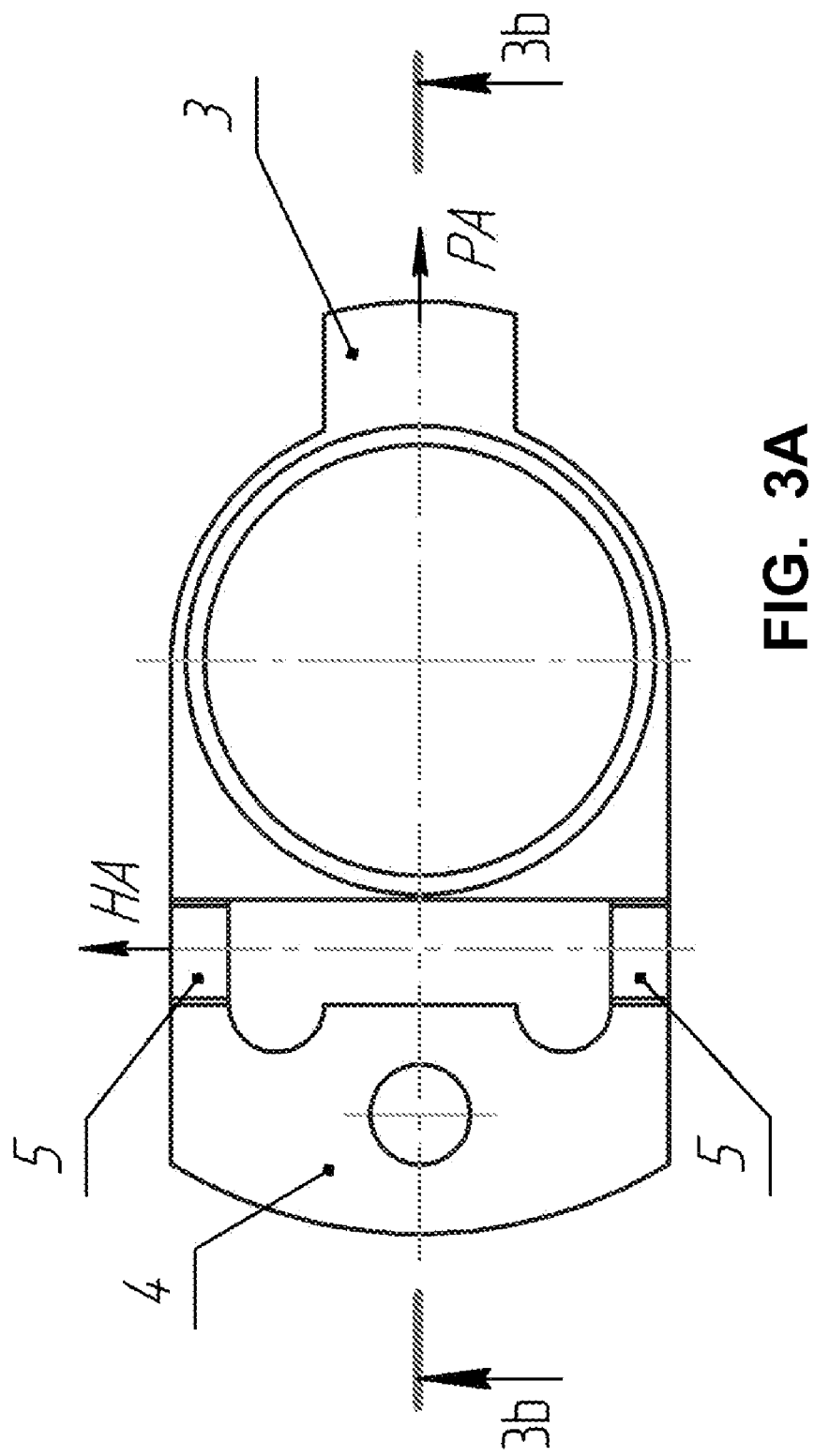

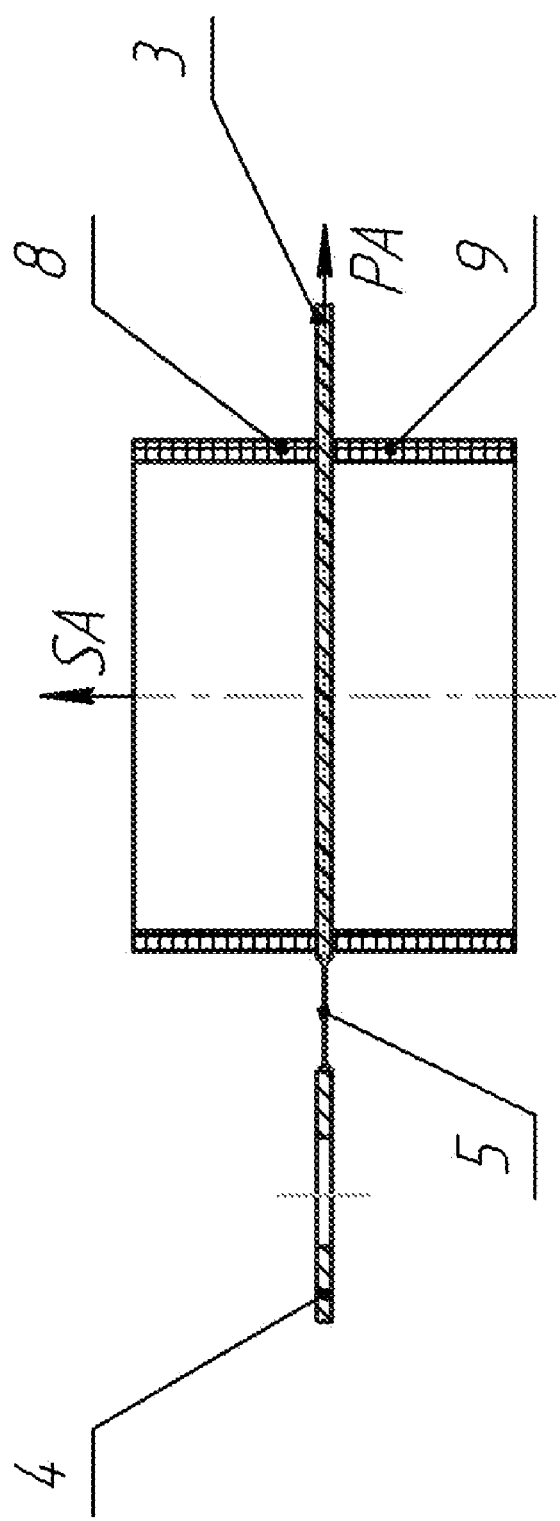

SERVO COMPENSATING ACCELEROMETER

CROSS-REFERENCE TO RELATED APPLICATIONS

This application is a non-provisional of U.S. Provisional Patent Application No. 60/777,563, filed on Mar. 1, 2006, entitled SERVO COMPENSATING ACCELEROMETER, which is incorporated by reference herein in its entirety.

BACKGROUND OF THE INVENTION

1. Field of the Invention

The present invention is related to accelerometers, and more particularly, to servo-compensated pendulum-type linear accelerometers with flexible suspension of the sensing element.

2. Background Art

A conventional accelerometer is described in U.S. Pat. No. 4,498,342. Such an accelerometer includes a housing, a proof mass ("PM," sometimes also called "pendulum inertial mass") that is placed in a gas damping chamber, and is flexibly attached to a ring frame, which is itself placed in the housing. A differential angular sensing element, a preamplifier, a correcting element, an amplifier, and a momentum sensor with moving coils, all collectively form a feedback circuit of such an accelerometer. The proof mass, the flexible suspension, and the frame are all manufactured from a single silicon monocrystalline wafer.

In this accelerometer, the momentum sensor includes two permanent magnets with cup-like magnetic conductors and two balancing coils, which are located on both sides of the wafer PM. Current that flows through each coil creates a magnetic field, which interacts with the magnetic field of the corresponding magnetic stator, forming a compensating force which is applied to the proof mass. By controlling the electric current that passes through the coils, it is possible to control the magnitude and direction of the compensating force. The differential angular sensor of this device uses a bridge circuit, that includes strain resistors. These strain resistors are formed on the silicon elements of the elastic suspension. The motion of the proof mass relative to the housing leads to a change in the differential resistance of the angular sensing element. This change in the resistance is used to determine the position of the proof mass.

When in use, the accelerometer is normally affixed to the object whose acceleration needs to be measured. The acceleration of the object along the sensitivity axis of the accelerometer leads to the rotation of the proof mass around the axis of suspension, relative to the stators of the momentum sensor. The change in the differential resistance, caused by the movement of the proof mass, is sensed by the feedback circuit. The feedback circuit reacts, generating a current, which is supplied to the balancing coils. As a result, a compensating force is generated, which returns the proof mass to its neutral position. The amount of current required to return the proof mass to its neutral position permits measuring the acceleration along the axis of sensitivity of the device.

This conventional accelerometer has a number of disadvantages. The use of a bridge circuit with strain resistors leads to a relatively large temperature drift of the zero bias of the accelerometer. Since the proof mass has elements of flexible suspension, the zero bias drift causes a fairly significant error in the compensating accelerometer's output, with the error being proportional to the stiffness of the flexible suspension.

Another problem with the conventional accelerometer described above is the lack of a system of adjustment of the zero bias drift for the signal that corresponds to angular displacement of the proof mass.

Yet another problem with this conventional accelerometer is the use of silicon, which makes the accelerometer more vulnerable to shock and vibration, particularly when the accelerometer is turned off.

Another conventional accelerometer is described in U.S. Pat. No. 6,073,490. This accelerometer includes a housing that can be disassembled, and a proof mass, which is connected to a frame using flexible suspension that is itself mounted within the housing. Both halves of the housing are in the shape of rectangular bars with cylindrical openings. A cup-like magnetic circuit, with the magnetic circuits having a gap between the field concentrators. The magnetic circuit also has a central core that includes a permanent magnet and a field concentrator. Both rectangular bars of the housing are formed of monocrystalline silicon, where the axes of the silicon crystal have the same orientation as the proof mass. The permanent magnet also has toroidal coils mounted thereon, with the toroidal coils being used to measure angular displacement, including differential measurement of the angular displacement.

The left and right halves of the accelerometer's housing are connected together by elastic elements (such as springs). Such an accelerometer functions as a fairly conventional device of the servo compensating type. When the base of the device moves with an acceleration that is directed along the axis of sensitivity of the device ("SA" in the figures of the U.S. Pat. No. 6,073,490 patent), the proof mass is displaced due to the momentum caused by the acceleration being measured. The angular displacement sensor converts the angular displacement of the proof mass into an electric signal. A preamplifier, a modulator, a correcting element, and an amplifier, all connected in series, form a servoamplifier of the accelerometer, and provide a signal that is supplied to the momentum sensor, and which is used to balance the momentum. The current that flows through the coils of the momentum sensor is the output signal of the accelerometer.

The accelerometer described above is particularly interesting for its mechanical construction and the principle on which the angular displacement sensor works. The moveable coils of the momentum sensor receive an AC signal from a high frequency generator, which is connected to the input of the amplifier. This current creates an AC magnetic flux, which passes through the toroidal coils of the angular displacement sensor, which are located on the central cores of the magnetic circuits of the momentum sensor. This magnetic flux, which passes through the toroidal coils of the angular displacement sensor, changes when the position of the proof mass relative to the housing is changed, due to the fact that the displacement of the proof mass changes the magnetic coupling between the moveable coils and the magnetic circuit.

Alternating voltages are induced in the coils of the angular displacement sensor. The amplitude of these voltages depends on the mutual position of the moveable coils of the momentum sensor and the coils of the angular displacement sensor, in other words, on the position of the proof mass of the accelerometer relative to its housing. The differentially coupled coils of the angular displacement sensor create a high frequency AC output signal. Its amplitude is proportional to the angular displacement of the proof mass, while its phase depends on the direction of the angular displacement of the proof mass. Thus, in this accelerometer, movable coils of the momentum sensor act as primary windings of the angular displacement sensor. Both the output coils of the angular displacement sensor and the coils of the momentum sensor use a common magnetic circuit. This simplifies the construction of the accelerometer.

The accelerometer of U.S. Pat. No. 6,073,490 has a number of disadvantages. One of the disadvantages is the fact that the proof mass and its flexible suspension and its frame are both manufactured from monocrystalline silicon, while the magnetic circuits are manufactured from metallic elements. The coefficients of thermal expansion of the various elements of the various parts of the accelerometer are different. This leads to a temperature-dependent zero bias drift, which frequently requires selection of particular combinations of materials from which the various parts of the accelerometer are made.

Another disadvantage is that the construction of the device includes a means for electrically tuning the output zero bias drift signal of the angular displacement sensor. Such a tuning, is generally accomplished by short circuiting some portions of the toroidal coils that are located around the central cores of the magnetic circuit.

As shown in FIG. 4 of U.S. Pat. No. 6,073,490, it is possible to mechanically tune the output zero bias drift signal of the angular displacement sensor. This is done by changing the position of the ferromagnetic core relative to the angular displacement sensor coils. However, it should be remembered that the permanent magnets are on the outside, while the metallic magnetic conductor, within which the core moves, is on the inside. This leads to external magnetic fields affecting the magnetic flux within the accelerometer, which reduces the accuracy of the measurement.

Another disadvantage is that the device has a single base surface on which it rests, which is perpendicular to its axis of sensitivity. When measuring two or three projections of the acceleration vector of the object onto which the accelerometer has been affixed, the existence of only a single base mounting surface complicates the process of installation of the accelerometer, and requires additional mounting elements and fixtures for mounting the accelerometer.

The use of moving coils in the accelerometer, in the momentum rotation sensor, as excitation coils of the angular displacement sensor, reduces the magnitude of the maximum allowed voltage at the output of the amplifier by the amplitude of the high frequency excitation, as discussed above.

Accordingly, there is a need in the art for an accelerometer that addresses at least some of the above disadvantages.

BRIEF SUMMARY OF THE INVENTION

The present invention relates to a servo compensating accelerometer that substantially obviates one or more of the disadvantages of the related art.

More particularly, in an exemplary embodiment of the present invention, a servo compensating accelerometer includes a top housing half and a bottom housing half rigidly connected together, and each having coaxial threaded openings. A sensing element is positioned between the top and bottom halves and affixed to the bottom half. Top and bottom magnetic systems, each of which has a magnetic conductor, a permanent magnet and a field concentrator, the magnetic systems being mounted within the respective top and bottom halves of the housing using the threaded openings. A momentum sensor includes the top and bottom magnetic systems, and also includes two movable coils mounted on a plate and positioned within the magnetic systems. A differential angle sensor includes toroidal excitation coils located on the permanent magnets, the magnetic systems and the coils of the momentum sensor. Stop screws can be used to fix position of the magnetic systems relative to the top and bottom halves of the housing.

Two perpendicular surfaces can be located on the bottom half of the housing for mounting on the object whose acceleration is being measured. An electrical circuit that includes a preamplifier, a demodulator, a correcting element, a high frequency generator, an amplifier, the excitation coils and the movable coils, which collectively form a feedback circuit, and generate an output of the accelerometer using an inductor, a resistor, a capacitor and a filter. The sensing element, in one embodiment, can be metallic. The sensing element, in one embodiment, includes a proof mass formed by a plate and two coils of the angular displacement sensor, a non-moving base, and a flexible suspension of the proof mass to the non-moving base.

The differential angular displacement sensor includes the toroidal coils and the coils of the momentum sensor located on a plate of the sensing element, and the toroidal coils provide an output signal of the accelerometer. The accelerometer can be tuned by adjusting the position of the magnetic systems in the threaded openings.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings:

FIGS. 3A and 3B illustrate the construction of the sensing element of the accelerometer of one embodiment of the present invention.

DETAILED DESCRIPTION OF THE INVENTION

Reference will now be made in detail to embodiments of the present invention, examples of which are illustrated in the accompanying drawings.

Figure 1:
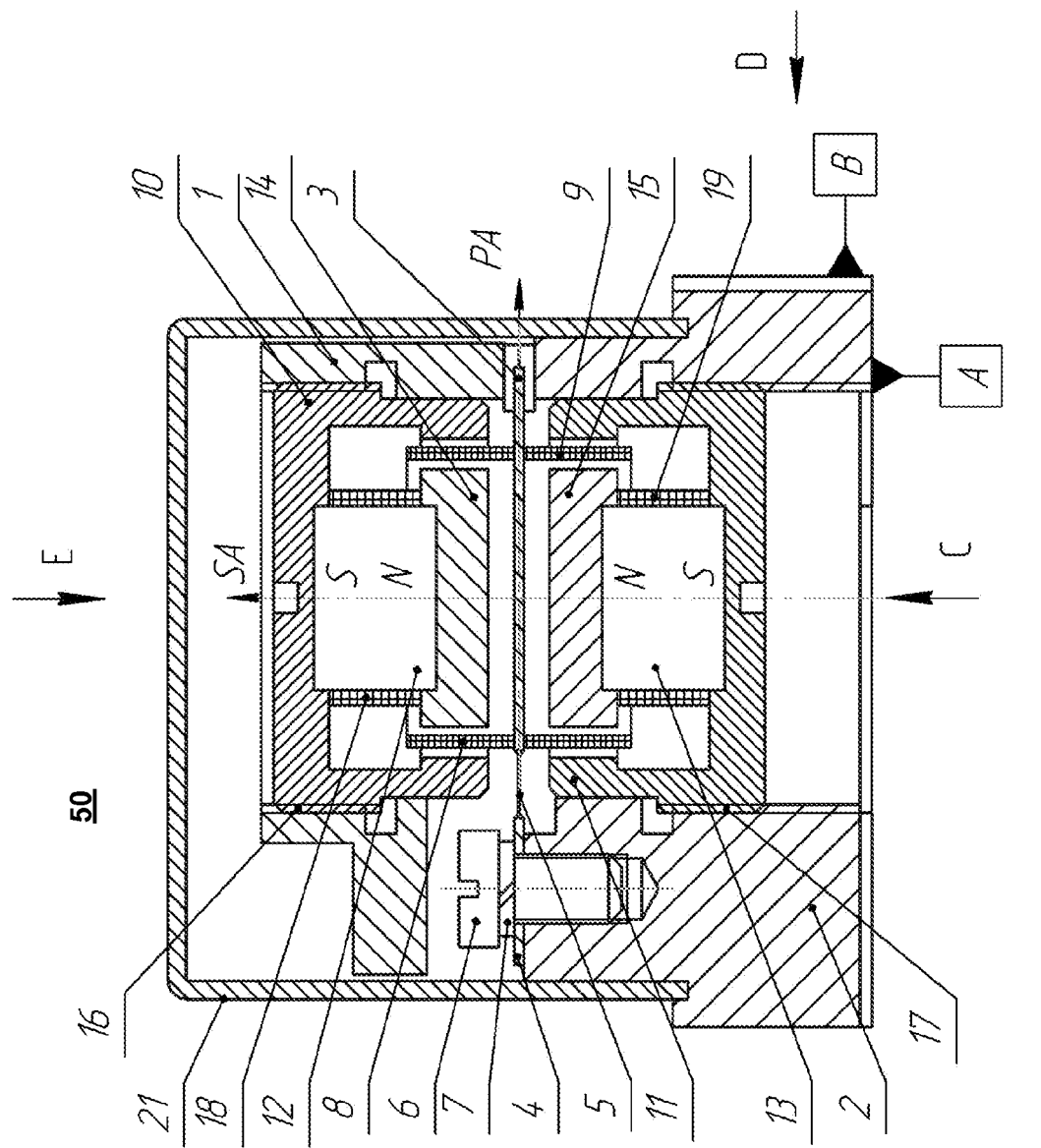
FIG. 1 illustrates a cross sectional view of one embodiment of the accelerometer of the present invention.

An exemplary embodiment of the accelerometer 50 of the present invention is illustrated in FIGS. 1 and 3, and includes a housing that has a top half 1 and a lower half 2, which are rigidly connected to each other. It will be understood that the designation of "top" and "bottom" is entirely arbitrary, and is used for convenience only. The top and bottom halves 1 and 2 are connected to each other and have coaxial threaded openings 16 and 17.

A sensing element is located inside the housing. The sensing elements include a proof mass PM, that includes a plate 3, and coils 8 and 9. The coils 8 and 9 are located on the plate 3. The coils 8 and 9 are used in the momentum sensor. The sensing element also includes a non-moving base 4 and an elastic suspension 5, which is used to attach the plate 3 to the base 4. The base 4 is fixedly mounted on the lower half of the housing 2, for example, using a screw 6 and a spring washer 7.

An optional external casing 21, see FIG. 1, can be used to enclose the entire accelerometer.

A differential sensor of the angular displacement (angle sensor) and a differential momentum sensor are located inside the housing. Both sensors use the same magnetic systems. These magnetic systems include magnetic conductors 10 and 11, permanent magnets 12 and 13, and field concentrators 14 and 15. Also, the magnetic conductors are attached to the corresponding upper and lower halves 1 and 2 using the threaded mounts 16 and 17. Toroidal excitation coils 18 and 19 of the angular displacement sensor are located on the magnets 12 and 13.

Figure 2:
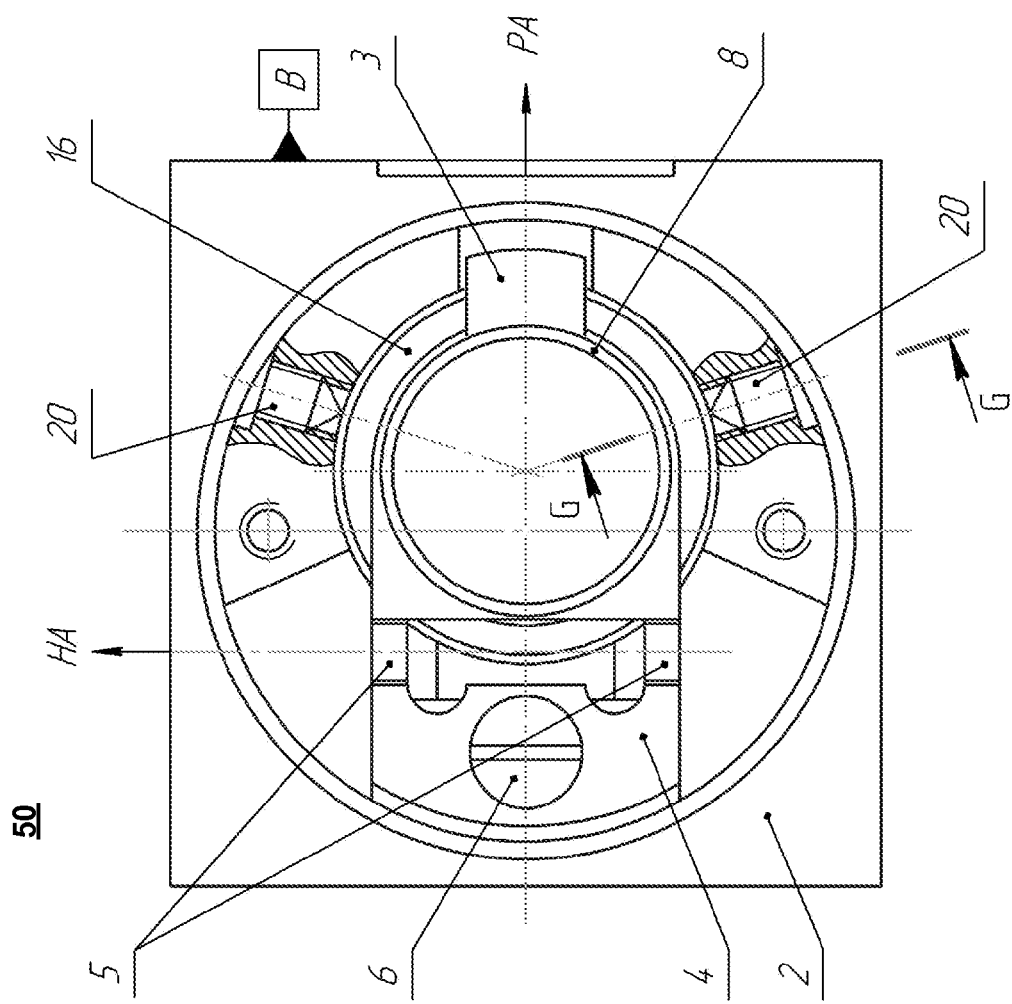
FIG. 2 illustrates a cross sectional view in the direction of the arrow E in FIG. 1.
Figure 4:
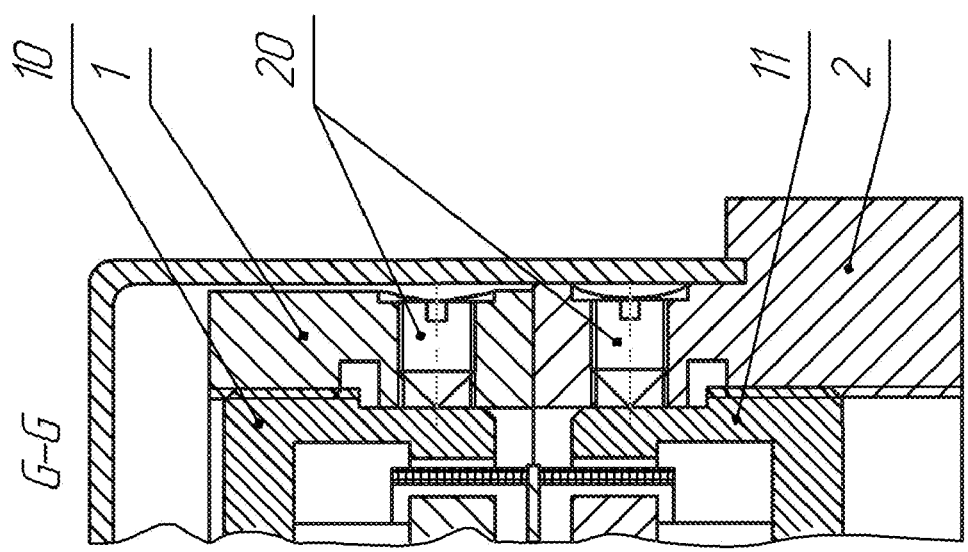
FIG. 4 illustrates a cross section along the line G-G of FIG. 2.

Moving coils 8 and 9 are located inside gaps within the magnetic systems, that are located between the surfaces of the corresponding magnetic conductors 10 and 11, and the magnetic field concentrators 14 and 15. The moving coils 8 and 9 which are part of the momentum sensor are also the output coils of the angular displacement sensor. The magnetic systems can move relative to the housing halves 1 and 2 along the axis SA using the threads 16 and 17, and are affixed to the housing using the screws 20, as shown in FIGS. 2 and 4. FIG. 2 shows the view in the direction of the arrow E in FIG. 1, with elements 1, 10, 12, 14, 18 and 21 not shown in this view.

Figure 5:
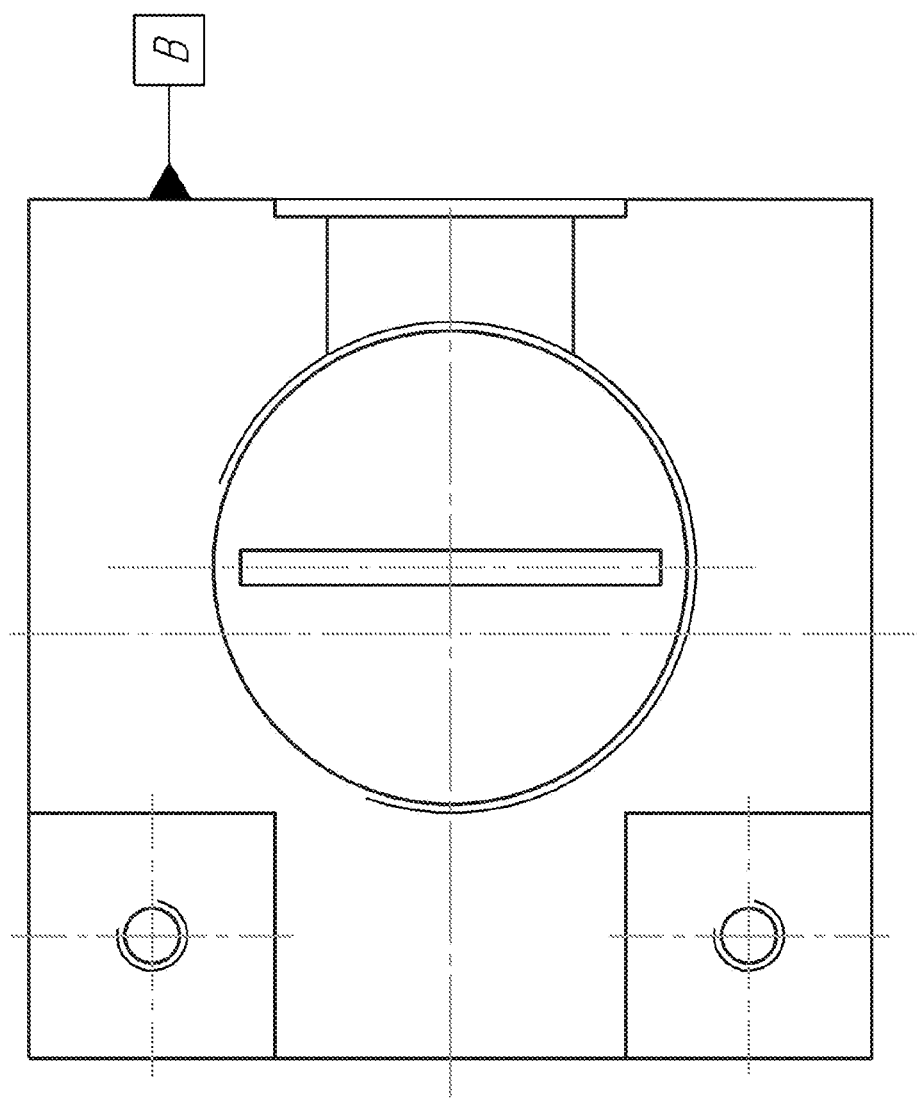
FIG. 5 illustrates a view along the arrow C in FIG. 1, which shows a base mounting surface A of the accelerometer.
Figure 6:
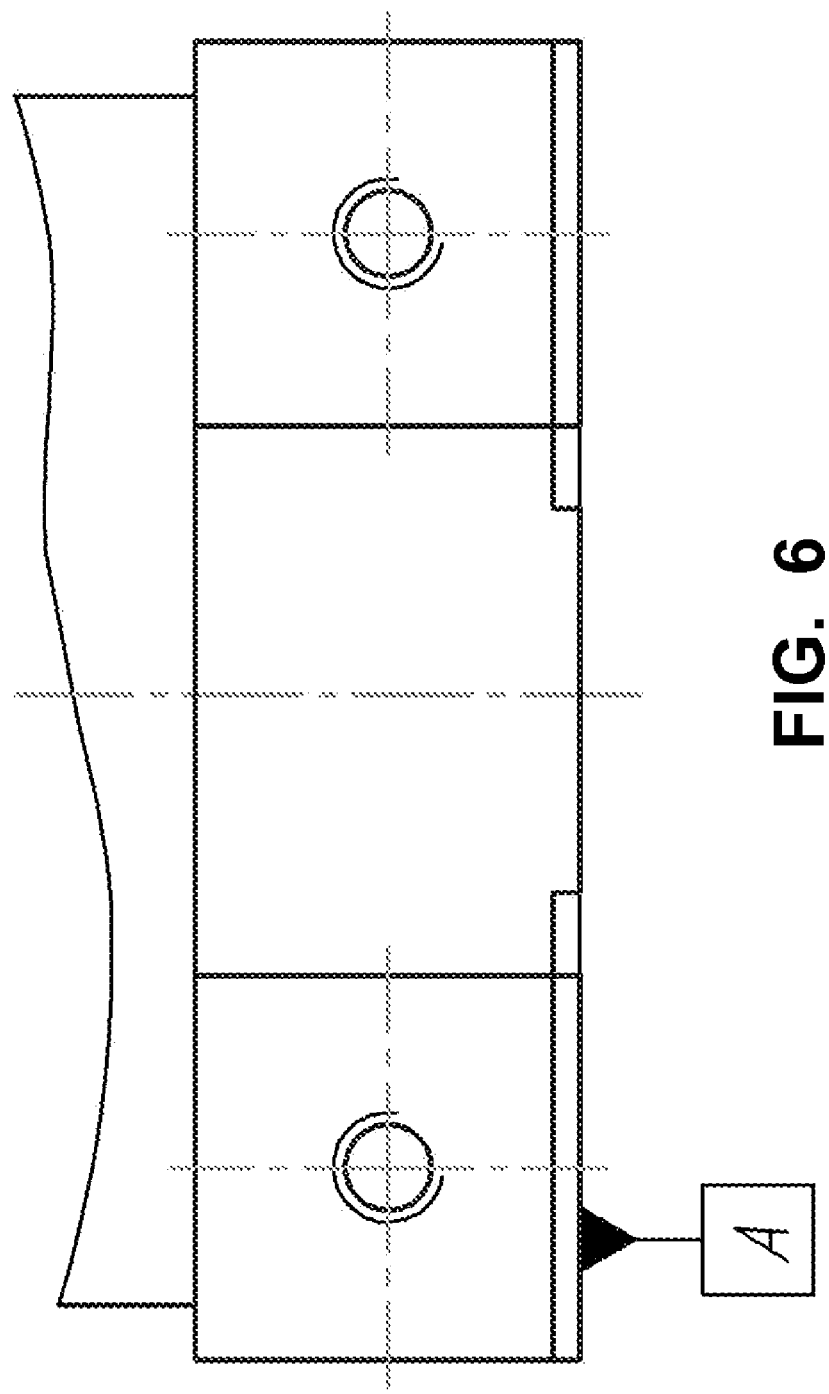
FIG. 6 illustrates a view in the direction of the arrow D in FIG. 1, which shows a base mounting surface B of the accelerometer.

FIG. 4 shows the view along the line G-G of FIG. 2. The lower half 2 of the housing has two perpendicular base mounting surfaces A and B, which can be used to mount the accelerometer on the object whose acceleration needs to be measured. For example, this can be done using screws that can be inserted into the threaded openings on the surfaces A and B. This is shown in FIGS. 5 and 6. FIG. 5 shows the base mounting surface A, which is visible when viewed in the direction of the arrow C in FIG. 1. FIG. 6 illustrates the base mounting surface B, which is visible when viewed in the direction of the arrow D in FIG. 1.

Figure 7:
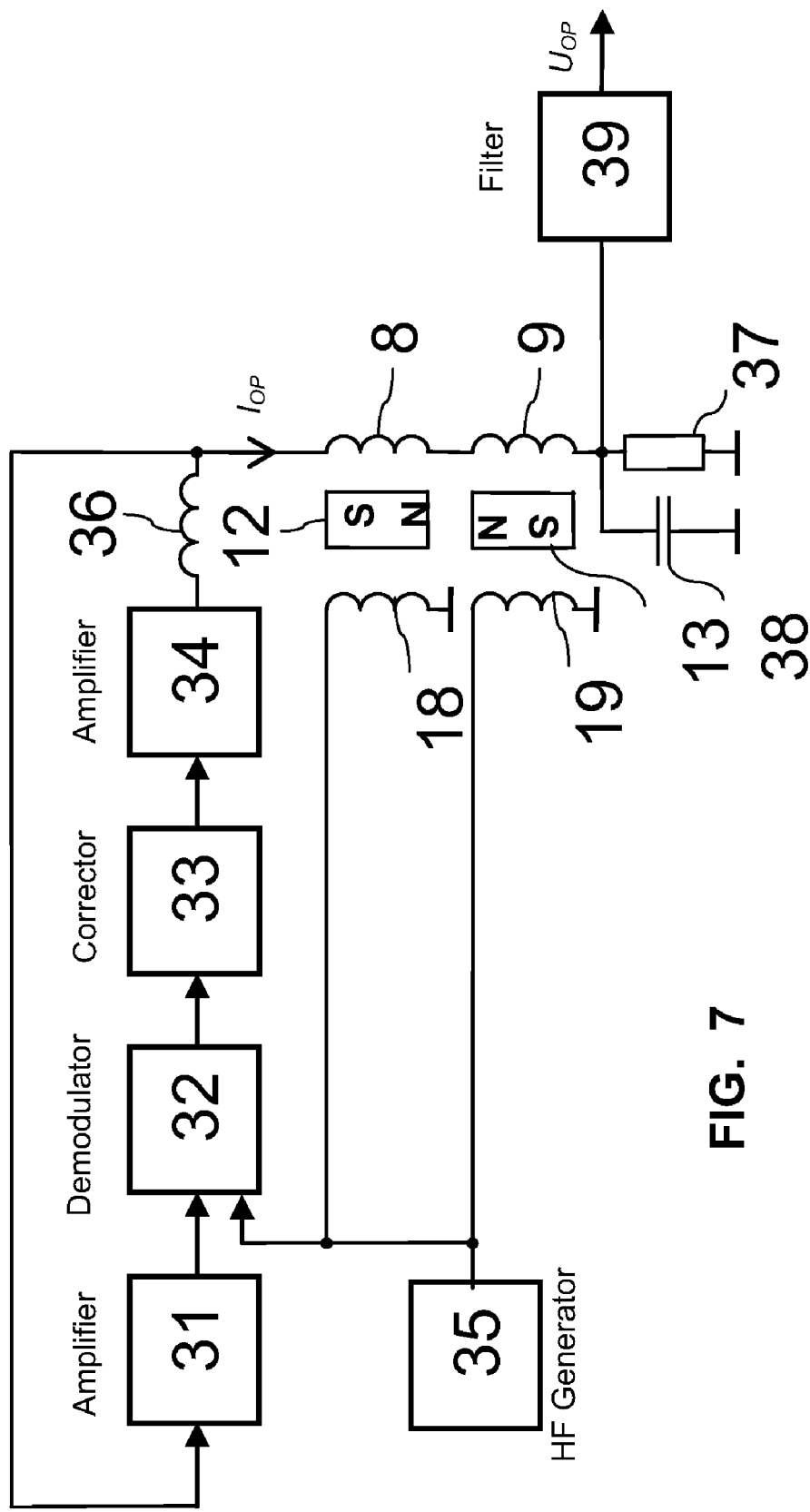
FIG. 7 illustrates an exemplary electrical schematic of the accelerometer of FIG. 1.

An exemplary electrical schematic of the accelerometer 50 is shown in FIG. 7. As shown in FIG. 7 it includes an amplifier 31, a demodulator 32, a correcting element 33, an amplifier 34, a high frequency generator 35, permanent magnets 12 and 13, movable coils 8 and 9, toroidal excitation coils of the angular displacement sensor 18 and 19, an inductive coil 36, resistor 37, capacitor 38 and filter 39. In this diagram, $U_{OP}$ is the output voltage of the accelerometer. The accelerometer works as follows:

When the object to which the accelerometer 50 is attached does not experience any acceleration, when the acceleration is directed along the axis SA, and when the accelerometer 50 has been tuned to remove the zero bias drift, the output voltage $U_{OP}$ is zero. When the object experiences acceleration a along the axis SA, the proof mass PM of the sensing element is displaced on the flexible suspension 5 relative to the housing of the accelerometer, due to its momentum, given by M=mLa (m—mass of the proof mass PM, L—distance from the axis of suspension HA to the center of the proof mass PM).

When the acceleration is positive, the proof mass PM is displaced towards the lower half 2 of the housing, and when the acceleration is negative, the proof mass PM is displaced towards the upper half 1 of the housing. Along with the proof mass PM, the movable coils 8 and 9 also move relative to the non-moving toroidal coils 18 and 19.

The toroidal coils 18 and 19 receive an input from the high frequency generator 35, as shown in FIG. 7. When this happens, the magnetic systems experience alternating magnetic fields having a constant amplitude and frequency. When the coils 8 and 9 move together with the proof mass PM, their magnetic coupling with the above-mentioned magnetic field changes. At the same time, the coils 8 and 9 experience an inductive voltage, where the direction of the current in the toroidal coils 18 and 19 is such that the voltage is subtracted. This voltage is received at the input of the preamplifier 31. The amplitude of the voltage is proportional to the magnitude of the proof mass PM displacement, while the phase of the voltage depends on the direction of the displacement. At one of the inputs of the demodulator 32, the high frequency voltage from the high frequency generator 35 is received. At the output of the demodulator 32, therefore, there is a DC voltage, whose magnitude is proportional to the magnitude of the displacement of the proof mass PM, and its polarity corresponds to the direction of the displacement of the proof mass PM.

Subsequently, the voltage passes through the correcting element 33 and the amplifier 34, whose output voltage is fed back, through the induction coil 36 to the moving coils 8 and 9. The current, flowing through the coils 8 and 9 as the feedback current $I_{OP}$, interacts with the magnetic fields of the permanent magnets 12 and 13, and creates a momentum of feedback force $M_F$, which balances out the moment of inertia $M_I$ of the acceleration that is being measured, and which returns the proof mass PM to the neutral position. The current $I_{OP}$, flowing to the resistor 37 creates a voltage $U_{OP}=I_{OP}R$, where R is the value of the resistor 37, and $U_{OP}$ is the output voltage signal of the accelerometer 50.

Figure 8:
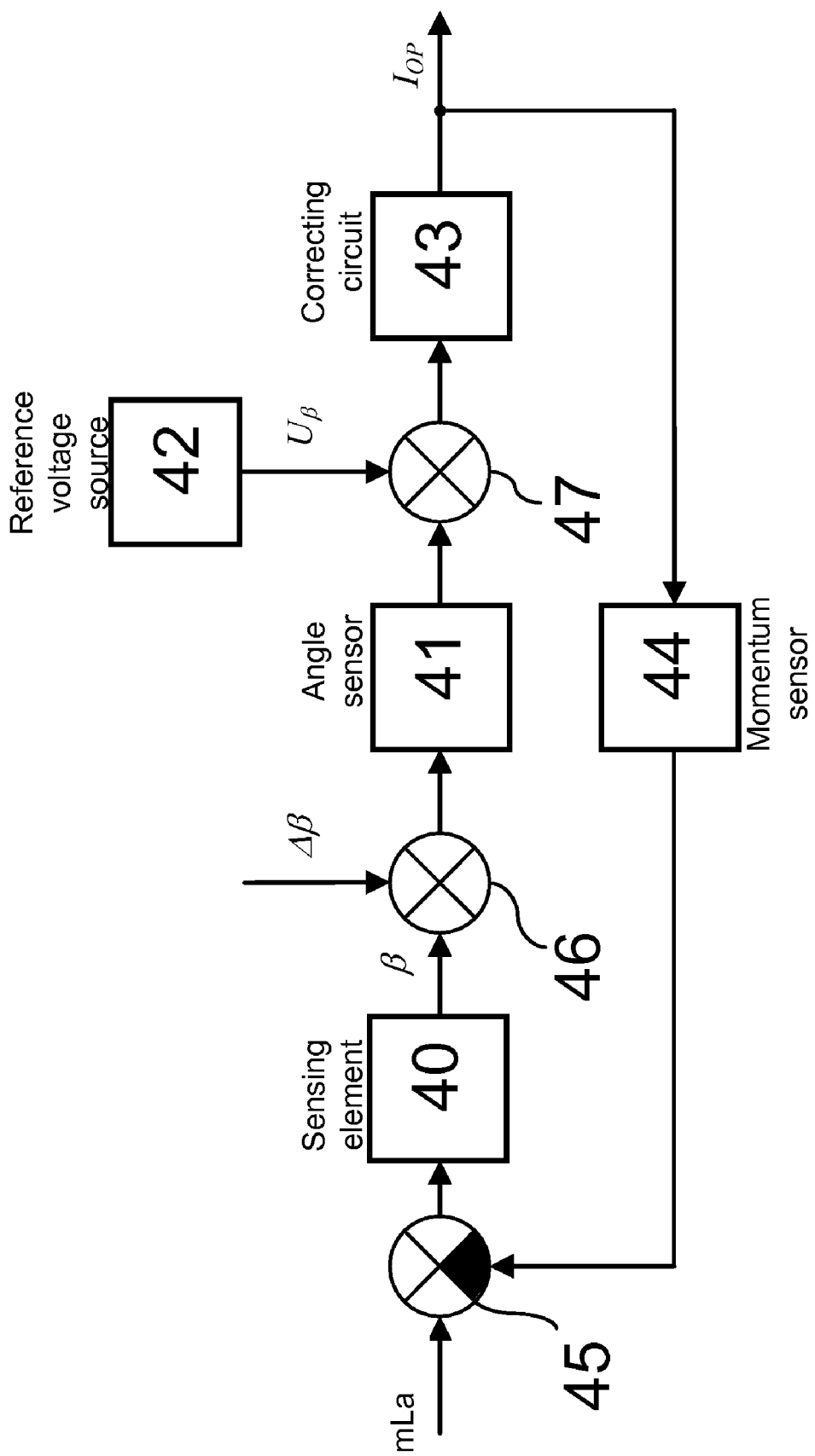
FIG. 8 illustrates a structural schematic of mechanical tuning of the zero bias drift of the angular displacement sensor.

The mechanical tuning is explained with reference to FIGS. 8, 9A and 9B. FIG. 8 illustrates the sensing element 40, the angular displacement sensor 41, a reference voltage source 42, a correcting element 43 with an amplifier, a momentum sensor 44, and summers 45, 46 and 47. The angular displacement sensor 41 measures the angle, such that with the help of the summer 46, the angle can be represented as the sum of two angles:

The angle β, which is the displacement of the proof mass PM from the neutral position, where the neutral position is understood to be one where the sum of all the forces applied to the proof mass PM equals zero; and The angle Δβ, which represents the error in the tuning of the angular displacement sensor, which is the angle between the neutral position of the proof mass PM and the position of the proof mass PM where the voltage at the output of the angular displacement sensor 41 equals zero.

The error in the tuning of the angular displacement sensor 41 leads to a shift in the zero of the output signal of the accelerometer, which is shown in the diagram as the feedback current $I_{OP}$, which flows through the coils of the momentum sensor 44. To reduce this shift of the zero bias, an electrical compensation circuit is typically used to compensate for the error. In FIG. 8, this is the summer 47, which is at the output of the angular displacement sensor 41, and regulated reference voltage $U_\beta$ source 42. The signal at the output of the summer 47 is fed through the correcting element and the amplifier 43, which is connected to the momentum sensor 44. For this circuit, considering that the element 43 typically includes an integrator in most accelerometers, in a static state, when the sum of all the moments of the external forces is zero when applied to the proof mass PM, the following equation (1) holds true for the zero shift ΔI of the accelerometer:

$$\Delta I = \frac{c}{k_1}\left(\Delta\beta - \frac{1}{k_2}U_\beta\right), \quad (1)$$

where c is the angular stiffness of the suspension of the proof mass, $k_1$ is the coefficient of transmission of the momentum sensor (a constant), and $k_2$ is the coefficient of transmission of the angular displacement sensor (also a constant).

During tuning, by changing the voltage Uβ, attempts to fulfill the condition are as follows:

$$\Delta\beta^* - \frac{1}{k_2^*}U_\beta^* = 0, \quad (2)$$

where the * indicates that the values are determined at the moment of completion of the tuning. However, during the normal functioning of the accelerometer, due to changes in temperature compared to the temperature when the tuning was performed, all of the parameters of Equation (1) will change their values, and a zero bias drift will result as follows:

$$\Delta I \approx \frac{c}{k_1}\Delta t \Delta\beta^*(\alpha_\beta + \alpha_2 - \alpha_U), \quad (3)$$

where $\alpha_\beta$ is the temperature coefficient of the error angle of the angular displacement sensor tuning Δβ, $\alpha_2$ is the temperature coefficient of the coefficient of transmission of the angular displacement sensor, and au is the temperature coefficient of the voltage $U_\beta$. As may be seen from Equation (3), the shift in the zero of the output signal ΔI, due to the change in the temperature, is directly proportional to the error Δβ of the angular displacement sensor. Reducing this error by the mechanical tuning proposed above permits an increase in the accuracy of the measurements of the accelerometer.

Figure 9A:
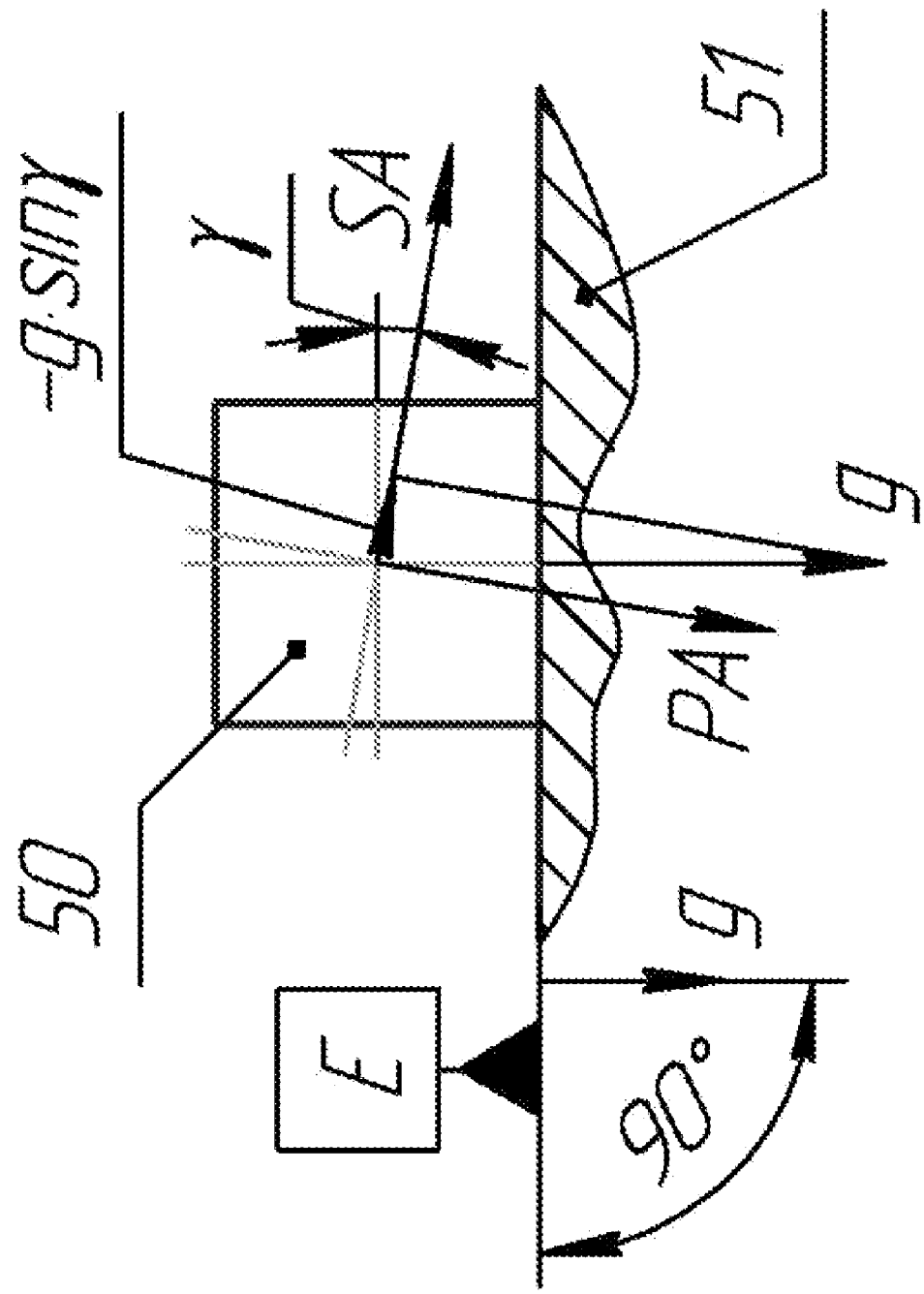
FIGS. 9A and 9B illustrate the principle of kinematic tuning of the zero bias drift of the angular displacement sensor.
Figure 9B:
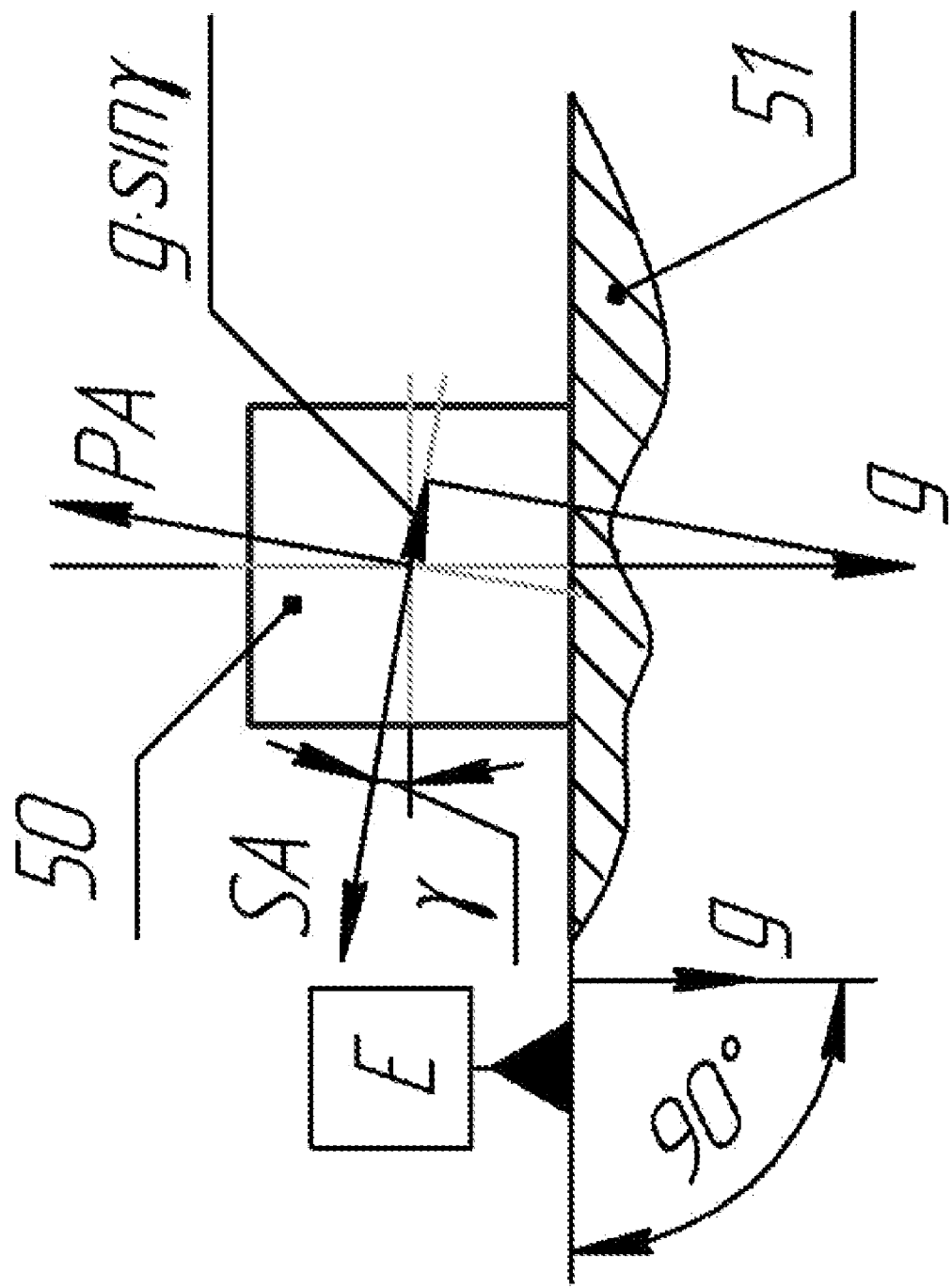

FIGS. 9A and 9B illustrate the principles of mechanical tuning of the zero bias of the angular displacement sensor. Shown in FIGS. 9A and 9B is the accelerometer 50 and a horizontal base 51, on which the tuning is performed. Tuning of the zero bias is done as follows:

The base 51 is placed horizontally, such that the gravitational force vector g is perpendicular to the surface E of the base surface 51. The accelerometer is placed on the surface E in position I (FIG. 9A) and II (FIG. 9B), with the axes SA and PA oriented as shown. At the same time, the axis SA needs to be parallel to the surface E, the axis PA is oriented in the direction I along the gravitational force vector g (downwards), and in position II—against the gravitational force vector g, in other words, upwards. However, the accelerometer always has an error of the base surface γ (in other words, the angle by which the axis SA deviates from perfect perpendicularity relative to the surface A). Here, the output signals of the accelerometer in positions I and II are as follows:

$$U_{op}^I = U_o - kg\sin\gamma,$$

$$U_{op}^{II} = U_o + kg\sin\gamma, \quad (4)$$

where $U_0$ is the shift in the zero of the output signal of the accelerometer, caused by the shift of the zero of the angular displacement sensor, k is the coefficient of transmission of the accelerometer (a constant), and g is the force of gravity.

From Equation (4) it follows that:

$$U_{op}^I + U_{op}^{II} = 2U_o. \quad (5)$$

The purpose of the mechanical tuning of the zero signal of the angular displacement sensor is to get $$U_o = 0, \quad (6)$$

which, as is clear from Equation (5), can be achieved when:

$$U_{op}^I = -U_{op}^{II}. \quad (7)$$

The tuning of the angular displacement sensor involves a step-wise approximation to Equation (7) by moving the magnetic conductors 10 and 11 along the threads 16 and 17 relative to the housing halves 1 and 2, and controlling the voltages $U_{op}^I$ and $U_{op}^{II}$ in positions I and II after the change in position of each of the magnetic conductors 10 and 11.

After the tuning of the angular displacement sensor, the magnetic conductors 10 and 11 are fixed in place using the screws 20 in the housing halves 1 and 2.

Having thus described embodiments of the invention, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A servo compensating accelerometer comprising:
   a housing that includes a top half and a bottom half, each half having an opening;
   top and bottom magnetic systems within the housing, the magnetic systems adjustably positioned in the openings for tuning of an output signal of a differential angular displacement sensor, wherein each magnetic system includes a magnetic conductor, a magnet inside the magnetic conductor, and a field concentrator;
   two movable coils mounted on a movable plate that is suspended using a metallic suspension, and magnetically coupled to the respective magnetic systems, the movable coils and the magnetic systems forming a momentum sensor;

two toroidal excitation coils located on the respective magnets that, together with the magnetic systems and the movable coils, form the differential angular displacement sensor; and a feedback electrical circuit that generates an output signal based on an output of the momentum sensor and which is proportional to applied acceleration and provides a feedback signal to the movable coils to return the movable plate and the movable coils to a neutral position.

2. The accelerometer of claim 1, wherein the openings in the top half and the bottom half are coaxial.

3. The accelerometer of claim 1, wherein the openings in the top half and the bottom half are threaded.

4. The accelerometer of claim 3, wherein the magnetic systems are movable along the threaded openings.

5. The accelerometer of claim 4, wherein a zero bias of the differential angular displacement sensor is tuned by adjusting a position of the magnetic systems by moving the magnetic systems using the threaded openings.

6. The accelerometer of claim 1, wherein the magnetic systems are fixed using stop screws.

7. The accelerometer of claim 1, wherein the magnets are permanent magnets.

8. The accelerometer of claim 1, further comprising two perpendicular mounting surfaces located on the bottom half of the housing.

9. The accelerometer of claim 1, wherein a proof mass is formed by the movable plate and the two movable coils of the momentum sensor.

10. The accelerometer of claim 1, wherein the differential angular displacement sensor includes the toroidal excitation coils located on the respective magnets of the magnetic systems and the movable coils of the momentum sensor located on a plate, and wherein the momentum sensor coils provide the output signal of the accelerometer.

11. A servo compensating accelerometer comprising:

a housing having two opposing openings;

a momentum sensor formed by two movable coils and two magnetic systems, wherein the two movable coils are affixed to a movable plate that is flexibly suspended using a metallic suspension and positioned in gaps of the magnetic systems, and wherein each magnetic system includes a magnetic conductor, a magnet inside the magnetic conductor and a field concentrator;

a differential angular displacement sensor formed by two toroidal excitation coils located on the respective magnets, the magnetic systems and the movable coils, wherein the magnetic systems are mechanically adjustable for tuning an output signal of the differential angular displacement sensor; and an electrical circuit that generates an output signal based on an output of the momentum sensor and which is proportional to applied acceleration and provides a signal to the momentum sensor to return the movable plate and the movable coils to a neutral position.

12. The accelerometer of claim 11, wherein the two openings are coaxial.

13. The accelerometer of claim 11, wherein the two openings are threaded.

14. The accelerometer of claim 13, wherein the magnetic systems are movable along the threaded openings.

15. The accelerometer of claim 14, wherein a zero bias of the differential angular displacement sensor is tuned by adjusting a position of the magnetic systems by moving magnetic systems using the threaded openings.

16. The accelerometer of claim 11, wherein the magnetic systems are fixed using stop screws.

17. The accelerometer of claim 11, wherein the magnets are permanent magnets.

18. The accelerometer of claim 11, further comprising two perpendicular mounting surfaces located on a bottom half of the housing.

19. The accelerometer of claim 11, wherein a proof mass is formed by the movable plate and the two movable coils of the momentum sensor.

20. The accelerometer of claim 11, wherein the differential angular displacement sensor includes the toroidal excitation coils located on the respective magnets of the magnetic systems and the movable coils of the momentum sensor located on a plate, and wherein the momentum sensor coils provide the output signal of the angular displacement sensor.

* * * * *